(12) United States Patent
Chan et al.

(10) Patent No.: US 10,499,133 B1
(45) Date of Patent: Dec. 3, 2019

(54) EARPHONE PROVIDED WITH A CHARGING AND/OR DATA WIRE

(71) Applicants: Kiu Kin Chan, San Po Kong (HK); Hung To Li, San Po Kong (HK)

(72) Inventors: Kiu Kin Chan, San Po Kong (HK); Hung To Li, San Po Kong (HK)

(73) Assignee: UleEco Limited, San Po Kong (HK)

( * ) Notice: Subject to any disclaimer, the term of this patent is extended or adjusted under 35 U.S.C. 154(b) by 0 days.

(21) Appl. No.: 16/011,628

(22) Filed: Jun. 18, 2018

(51) Int. Cl.
*H04R 1/10* (2006.01)
*H02J 7/00* (2006.01)

(52) U.S. Cl.
CPC .......... *H04R 1/1025* (2013.01); *H02J 7/0052* (2013.01); *H04R 1/1016* (2013.01); *H04R 1/1033* (2013.01); *H02J 2007/0062* (2013.01); *H02J 2007/0096* (2013.01); *H04R 2420/09* (2013.01); *H04R 2499/11* (2013.01)

(58) Field of Classification Search
CPC ....... H04W 4/80; H04W 12/08; H04W 40/12; H04W 40/20; H04W 4/021; H04L 45/745; H04L 5/00; H04L 5/0007; H04L 67/04; H04L 67/10; H04L 67/125; H04L 67/18; H04R 2420/09; H04R 2420/07; H04R 1/1016; H04R 2205/021; H04R 1/1025; H04R 1/105; H04R 1/1058; H04R 1/1083; H04R 1/1091; H04R 2227/003; H04R 27/00; H04R 1/10; H04R 1/1033; H04R 1/1041; H04R 5/04
USPC ................ 381/94, 312, 1, 330, 327, 381, 74
See application file for complete search history.

(56) References Cited

U.S. PATENT DOCUMENTS

| | | | | |
|---|---|---|---|---|
| 6,230,344 B1 * | 5/2001 | Thompson | ........... | A47C 19/045 5/611 |
| 8,152,558 B2 * | 4/2012 | Broeksteeg | ......... | B60R 11/0241 439/378 |
| 9,991,628 B2 * | 6/2018 | Daoura | .............. | H01R 13/6205 |
| 2011/0111621 A1 * | 5/2011 | Wakrat | ................. | H04R 1/1033 439/502 |
| 2017/0111724 A1 * | 4/2017 | Toner | ................... | H04R 1/1033 |
| 2017/0211803 A1 * | 7/2017 | Wang | .................... | H01B 11/125 |

* cited by examiner

Primary Examiner — Lun-See Lao

(57) ABSTRACT

An earphone provided with a charging and/or data wire, having an earphone portion and a wire portion; one end of the earphone portion is fixedly provided with a wire socket; the wire portion has a wire for charging and/or data transmission; one end of the wire is fixedly provided with an earphone plug that matches with the wire socket and is connectable thereto; another end of the wire is fixedly provided with a wire plug.

11 Claims, 2 Drawing Sheets

EARPHONE PROVIDED WITH A CHARGING AND/OR DATA WIRE

BACKGROUND OF THE INVENTION

The present invention relates to an earphone, and more specifically relates to an earphone provided with a charging and/or data wire.

In general, an earphone now available in the market can only be connected to for example telephones or multimedia players for audio data transmission. Its function is too simple without any variation. A user may find it very inconvenient to cater the need of a charging wire if the telephone or multimedia player runs out of power when the user is listening to music.

BRIEF SUMMARY OF THE INVENTION

In view of the aforesaid disadvantages now present in the prior art, the present invention provides an earphone provided with a charging and/or data wire. The present invention is structurally simple and reasonable, convenient to use and achieves good applicability.

An earphone provided with a charging and/or data wire, comprising an earphone portion and a wire portion; one end of the earphone portion is fixedly provided with a wire socket; the wire portion comprises a wire for charging and/or data transmission; one end of the wire is fixedly provided with an earphone plug that matches with the wire socket and is connectable thereto; another end of the wire is fixedly provided with a wire plug.

In an embodiment, the wire plug is a USB-A plug, USB-C plug or Lightning plug.

In an embodiment, the earphone plug is a USB-C plug, and the wire socket 11 is a USB-C socket.

In an embodiment, the earphone plug is a foldable USB plug comprising a first component and a second component; the first component comprises two first electrical contact pieces/electrical contact wires of the USB plug; the second component comprises two second electrical contact pieces/electrical contact wires of the USB plug; the first component and the second component are configured as a connected or mutually separated structure; the foldable USB plug is folded or unfolded with the first component parallel to the second component at the time of use; the first component and the second component are connected with the wire; the wire socket is a socket that matches with the foldable USB plug and is connectable thereto; the wire socket is provided with an internal space having a size that matches the size of the foldable USB plug in a folded condition; inner side surfaces of the internal space are provided with electrical contact points which touch and contact the two first electrical contact pieces/electrical contact wires and the two second electrical contact pieces/electrical contact wires after the foldable USB plug is folded; the electrical contact points are disposed on two opposite inner side surfaces of the internal space of the wire socket; after the foldable USB plug is folded and inserted into the wire socket, the first electrical contact pieces/electrical contact wires and the two second electrical contact pieces/electrical contact wires contact the electrical contact points so that the wire socket and the earphone plug are in electrical communication.

The first electrical contact pieces/electrical contact wires and the second electrical contact pieces/electrical contact wires of the first component and the second component of the foldable USB plug are provided on insulated base plates; the first electrical contact pieces/electrical contact wires and the second electrical contact pieces/electrical contact wires are connected with the wire; outer sides of the wire are covered by a covering layer; the insulated base plates of both the first electrical contact pieces/electrical contact wires and the second electrical contact pieces/electrical contact wires and the covering layer are integrated as a one whole piece; the insulated base plate as well as portions of the covering layer of the first component form a separated or a connected structure with respect to the insulated base plate as well as portions of the covering layer of the second component.

The insulated base plate and/or the portions of the covering layer of the first component is/are connected with the insulated base plate and/or the portions of the covering layer of the second component via magnetic force, hinges, edge-folds or by embedment.

Said connection via magnetic force comprises magnetic strips/plates/pellets mutually attractable on a side surface(s) of the insulated base plate and/or the portions of the covering layer of the first component and an opposite side surface(s) of the insulated base plate and/or the portions of the covering layer of the second component by embedment or adhesion.

Said connection via hinges comprises hinges respectively provided on the insulated base plates of the first component and the second component and/or the respective portions of the covering layer of the first component and the second component; corresponding hinges are connected via a hinge shaft or mutually hinged together (hinge shaft not provided).

Said connection via edgefolds is an integrated structure formed by the insulated base plates of the first component and the second component and/or the respective portions of the covering layer of the first component and the second component, wherein edgefolds which are easily foldable are disposed in between the first component and the second component and/or the respective portions of the covering layer of the first component and the second component.

Said connection by embedment comprises blocks and receiving holes provided correspondingly on the insulated base plates of the first component and the second component and/or the respective portions of the covering layer of the first component and the second component; the blocks are embedded into the receiving holes to connect the first component and the second component.

An edge of an opening of the wire socket is provided with a buckle; after the foldable USB plug is inserted into the wire socket, the buckle can buckle on a recess or protrusion of the earphone plug to fix the earphone plug so that the earphone plug will not be easily disengaged by accident.

The earphone of the present invention is provided also with a charging and/or data wire, thus users can listen to music and charge batteries. Multifunctional nature of the present invention brings convenience to the users.

DETAILED DESCRIPTION OF THE INVENTION

The present invention is further described in detail below with reference to some embodiments and the accompanying drawings. It is understood that the present invention is not limited to the embodiments described herein.

Embodiment 1

Figure 1:
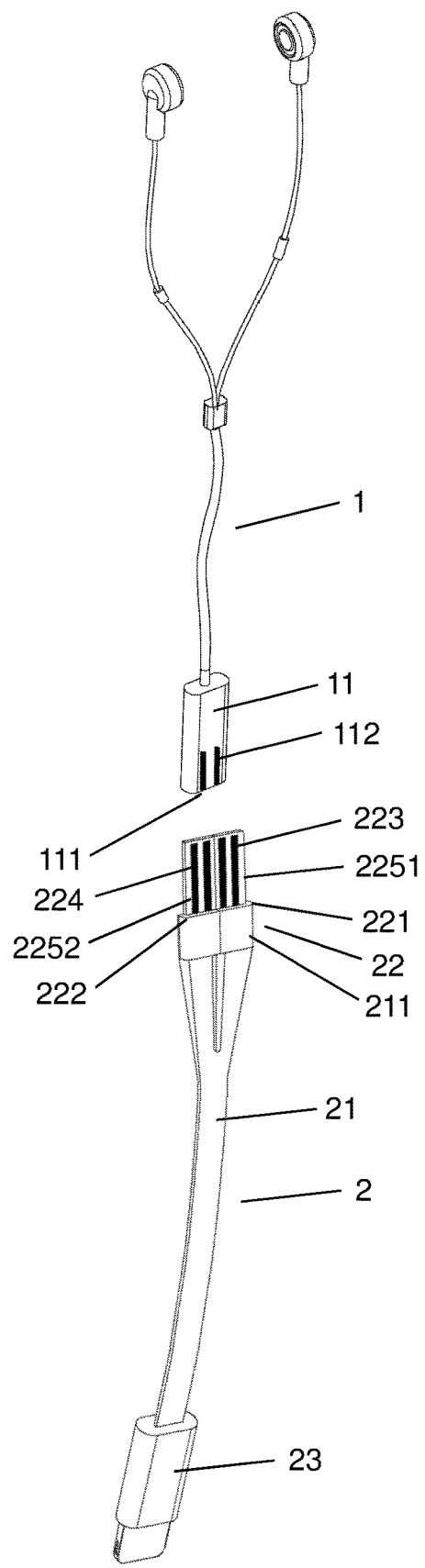
FIG. 1 is a structural diagram of the earphone provided with a charging and/or data wire according to the present invention.
Figure 2:
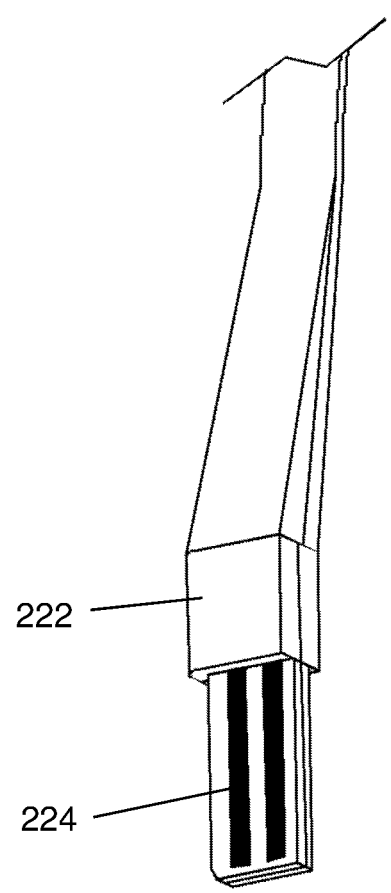
FIG. 2 shows the foldable USB plug which serves as an earphone plug as shown in FIG. 1 in a folded condition.

FIGS. 1-2 illustrate a detailed structure of the present invention. As shown in FIG. 1, the earphone provided with a charging and/or data wire comprises an earphone portion 1 and a wire portion 2. One end of the earphone portion 1 is fixedly provided with a wire socket 11; the wire portion 2 comprises a wire 21 for charging and/or data transmission; one end of the wire 21 is fixedly provided with an earphone plug 22 that matches with the wire socket 11 and is connectable thereto; another end of the wire 21 is fixedly provided with a wire plug 23. The wire plug 23 is a USB-A plug, USB-C plug or Lightning plug. The earphone plug 22 is a foldable USB plug comprising a first component 221 and a second component 222; the first component 221 comprises two first electrical contact pieces/electrical contact wires 223 of the USB plug; the second component comprises two second electrical contact pieces/electrical contact wires 224 of the USB plug; the first component 221 and the second component 222 can be configured as a connected or mutually separated structure; during use, the foldable USB plug can be folded (as shown in FIG. 2) or unfolded with the first component parallel to the second component (as shown in FIG. 1); when the foldable USB plug is used unfolded with the first component parallel to the second component, it is used in the same way as an ordinary USB plug; the first component 221 and the second component 222 are connected with the wire 21. The first electrical contact pieces/electrical contact wires 223 and the second electrical contact pieces/electrical contact wires 224 of the first component 221 and the second component 222 of the foldable USB plug are provided on insulated base plates 225; the first electrical contact pieces/electrical contact wires 223 and the second electrical contact pieces/electrical contact wires 224 are connected with the wire 21; outer sides of the wire 21 are covered by a covering layer 211; the insulated base plates 2251, 2252 of both the first electrical contact pieces/electrical contact wires 223 and the second electrical contact pieces/electrical contact wires 224 and the covering layer 211 are integrated as a one whole piece; the insulated base plate 2251 as well as portions of the covering layer 211 of the first component 221 form a separated or a connected structure with respect to the insulated base plate 2252 as well as portions of the covering layer 211 of the second component 222; the insulated base plate 2251 and/or the portions of the covering layer 211 of the first component 221 is/are connected with the insulated base plate 2252 and/or the portions of the covering layer 211 of the second component 222 via magnetic force. Said connection via magnetic force is achieved by providing magnetic strips/plates/pellets mutually attractable on a side surface(s) of the insulated base plate 2251 and/or the portions of the covering layer 211 of the first component 221 and an opposite side surface(s) of the insulated base plate 2252 and/or the portions of the covering layer 211 of the second component 222 by embedment or adhesion. The wire socket 11 is a socket that matches with the foldable USB plug and is connectable thereto; the wire socket 11 is provided with an internal space 111 having a size that matches the size of the foldable USB plug in a folded condition; inner side surfaces of the internal space 111 are provided with electrical contact points 112 (the way the electrical contact points 112 are shown in FIG. 1 intends to indicate their positions in the internal space 111 and does not mean that the electrical contact points 112 are exposed outside the wire socket 11). which touch and contact the two first electrical contact pieces/electrical contact wires 223 and the two second electrical contact pieces/electrical contact wires 224 after the foldable USB plug is folded; the electrical contact points 112 are disposed on two opposite inner side surfaces of the internal space 111 of the wire socket 11; after the foldable USB plug is folded and inserted into the wire socket 11, the first electrical contact pieces/electrical contact wires 223 and the two second electrical contact pieces/electrical contact wires 224 contact the electrical contact points 112 so that the wire socket 11 and the earphone plug 22 are in electrical communication. An edge of an opening of the wire socket 11 can be provided with a buckle; after the foldable USB plug is inserted into the wire socket 11, the buckle can buckle on a recess or protrusion of the earphone plug 22 to fix the earphone plug 22 so that the earphone plug 22 will not be easily disengaged by accident.

In another embodiment, the insulated base plate 2251 and/or the portions of the covering layer 211 of the first component 221 is/are connected with the insulated base plate 2252 and/or the portions of the covering layer 211 of the second component 222 via hinges; said connection via hinges comprises hinges respectively provided on the insulated base plates 2251, 2252 of the first component 221 and the second component 222 and/or the respective portions of the covering layer 211 of the first component 221 and the second component 222; corresponding hinges are connected via a hinge shaft or mutually hinged together (hinge shaft not provided).

In another embodiment, the insulated base plate 2251 and/or the portions of the covering layer 211 of the first component 221 is/are connected with the insulated base plate 2252 and/or the portions of the covering layer 211 of the second component 222 via edgefolds; said connection via edgefolds means the insulated base plates 2251, 5525 of the first component 221 and the second component 222 and/or the respective portions of the covering layer 211 of the first component 221 and the second component 222 form an integrated structure wherein edgefolds which are easily foldable are disposed in between.

In another embodiment, the insulated base plate 2251 and/or the portions of the covering layer 211 of the first component 221 is/are connected with the insulated base plate 2252 and/or the portions of the covering layer 221 of the second component 222 by embedment; said connection by embedment comprises blocks and receiving holes provided correspondingly on the insulated base plates 2251, 2252 of the first component 221 and the second component 222 and/or the respective portions of the covering layer 211 of the first component 221 and the second component 222; the blocks are embedded into the receiving holes to connect the first component 221 and the second component 222.

In another embodiment, the earphone plug 22 is a USB-C plug, and the wire socket 11 is a USB-C socket.

The embodiments described above are preferred embodiments of the present invention. It is understood that the present invention should not be limited to the embodiments as described. Any changes, modifications, replacements, combinations and simplification without deviating from the essence and principle of the present invention should be considered alternative configurations that are equally effective and should also fall within the scope of protection of the present invention.

What is claimed is:

1. An earphone provided with a charging and/or data wire, comprising an earphone portion and a wire portion; one end of the earphone portion is fixedly provided with a wire socket; the wire portion comprises a wire for charging and/or data transmission; one end of the wire is fixedly provided with an earphone plug that matches with the wire socket and is connectable thereto; another end of the wire is fixedly provided with a wire plug; the earphone plug is a foldable USB plug comprising a first component and a second component foldable against each other; the wire socket is provided with an internal space having a size that matches the size of the foldable USB plug in a folded condition and is connectable to the foldable USB.

2. The earphone provided with a charging and/or data wire as in claim 1, wherein the wire plug is a USB-A plug, USB-C plug or Lightning plug.

3. The earphone provided with a charging and/or data wire as in claim 1, wherein the earphone plug is a USB-C plug, and the wire socket 11 is a USB-C socket.

4. The earphone provided with a charging and/or data wire as in claim 1, wherein the first component comprises two first electrical contact pieces/electrical contact wires of the USB plug; the second component comprises two second electrical contact pieces/electrical contact wires of the USB plug; the first component and the second component are configured as a connected or mutually separated structure; the first component and the second component are connected with the wire; inner side surfaces of the internal space are provided with electrical contact points which touch and contact the two first electrical contact pieces/electrical contact wires and the two second electrical contact pieces/electrical contact wires after the foldable USB plug is folded; the electrical contact points are disposed on two opposite inner side surfaces of the internal space of the wire socket; after the foldable USB plug is folded and inserted into the wire socket, the first electrical contact pieces/electrical contact wires and the two second electrical contact pieces/electrical contact wires contact the electrical contact points so that the wire socket and the earphone plug are in electrical communication.

5. The earphone provided with a charging and/or data wire as in claim 4, wherein the first electrical contact pieces/electrical contact wires and the second electrical contact pieces/electrical contact wires of the first component and the second component of the foldable USB plug are provided on insulated base plates; the first electrical contact pieces/electrical contact wires and the second electrical contact pieces/electrical contact wires are connected with the wire; outer sides of the wire are covered by a covering layer; the insulated base plates of both the first electrical contact pieces/electrical contact wires and the second electrical contact pieces/electrical contact wires and the covering layer are integrated as a one whole piece; the insulated base plate as well as portions of the covering layer of the first component form a separated or a connected structure with respect to the insulated base plate as well as portions of the covering layer of the second component.

6. The earphone provided with a charging and/or data wire as in claim 5, wherein the insulated base plate and/or the portions of the covering layer of the first component is/are connected with the Insulated base plate and/or the portions of the covering layer of the second component via magnetic force, hinges, edgefolds or by embedment.

7. The earphone provided with a charging and/or data wire as in claim 6, wherein said connection via magnetic force comprises magnetic strips/plates/pellets mutually attractable on a side surface(s) of the insulated base plate and/or the portions of the covering layer of the first component and an opposite side surface(s) of the insulated base plate and/or the portions of the covering layer of the second component by embedment or adhesion.

8. The earphone provided with a charging and/or data wire as in claim 6, wherein said connection via hinges comprises hinges respectively provided on the insulated base plates of the first component and the second component and/or the respective portions of the covering layer of the first component and the second component; corresponding hinges are connected via a hinge shaft or mutually hinged together.

9. The earphone provided with a charging and/or data wire as in claim 6, wherein said connection via edgefolds is an integrated structure formed by the insulated base plates of the first component and the second component and/or the respective portions of the covering layer of the first component and the second component, wherein edgefolds which are easily foldable are disposed in between the first component and the second component and/or the respective portions of the covering layer of the first component and the second component.

10. The earphone provided with a charging and/or data wire as in claim 6, wherein said connection by embedment comprises blocks and receiving holes provided correspondingly on the insulated base plates of the first component and the second component and/or the respective portions of the covering layer of the first component and the second component; the blocks are embedded into the receiving holes to connect the first component and the second component.

11. The earphone provided with a charging and/or data wire as in claim 4, wherein an edge of an opening of the wire socket is provided with a buckle; after the foldable USB plug is inserted into the wire socket, the buckle buckles on a recess or a protrusion of the earphone plug to fix the earphone plug.

* * * * *